Aug. 29, 1933.  E. B. AUERBACH  1,925,041
METHOD OF PRODUCING CARBON DIOXIDE IN SOLID FORM
Filed Sept. 16, 1929
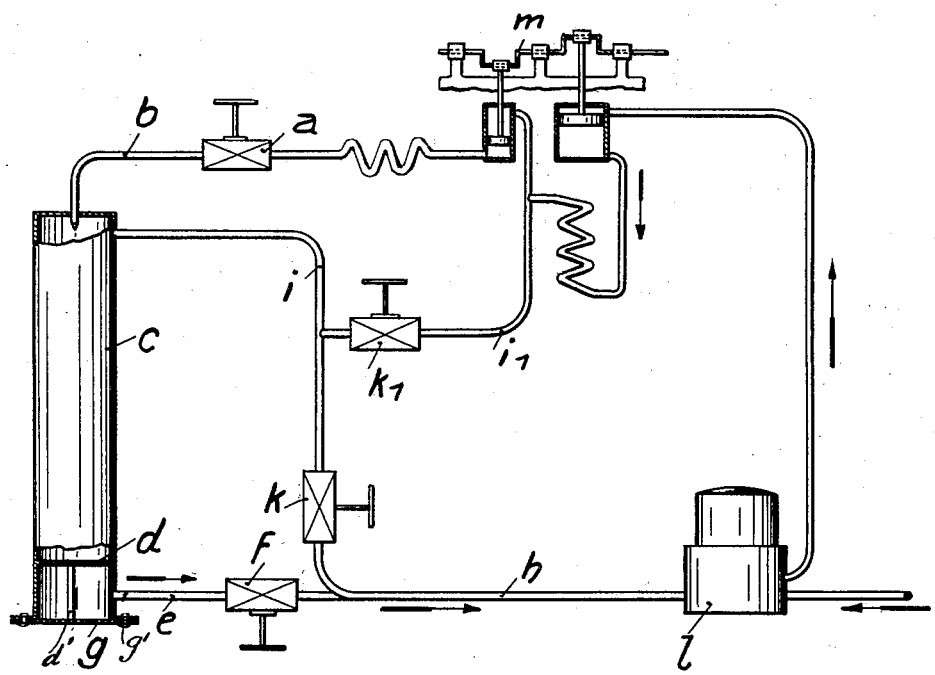
Inventor
Ernst Berthold Auerbach
Mock + Blum
Attorneys Patented Aug. 29, 1933

1,925,041

UNITED STATES PATENT OFFICE 1,925,041

METHOD OF PRODUCING CARBON DIOXIDE IN SOLID FORM

Ernst Berthold Auerbach, Berlin, Germany

Application September 16, 1929, Serial No. 393,094, and in Germany April 27, 1929

6 Claims. (Cl. 62—121)

My invention relates to a new and improved method of producing carbon dioxide in stable solid form, and to a new and improved article of manufacture, namely, a stable mass of solidified carbon dioxide.

One of the objects of my invention is to provide a new and improved method whereby a stable block of solidified carbon dioxide can be produced which has high density, so that the mass or block of solidified carbon dioxide can be efficiently used for refrigerating purposes.

Another object of my invention is to produce a new article of manufacture, namely, a mass or block of solidified carbon dioxide, of greater density than has heretofore been possible.

Another object of my invention is to provide a method whereby large masses of stable solidified carbon dioxide can be simply and cheaply produced.

Other objects of my invention will be set forth in the following description and diagrammatic illustration, it being understood that the above general statement of the objects of my invention is intended merely to generally explain the same and not to limit it in any manner.

Solidified carbon dioxide which is commonly called "carbon dioxide snow" has recently come into large commercial use. The physical characteristics of the solidified carbon dioxide are of great importance for its use as a refrigerant. The ordinary light and generally known carbon dioxide snow which has been produced by permitting liquid carbon dioxide to rapidly flow into a cloth bag or the like, has a loose structure of low density, and a large exposed or superficial surface, so that the carbon dioxide vaporizes very rapidly and the refrigerating effect is effective only for a short period.

It has been proposed to form a compact block from the carbon dioxide snow, and various methods have been suggested for this purpose. For example, it has been proposed to compress carbon dioxide snow by means of hydraulic presses, and it has been established that the extent of the compression is proportional to the pressure utilized and the period during which the pressure is applied. Since both of these factors have practical limits, it has not been found practical to form a block having a specific gravity which exceeds about 1.1.

In another process it has been proposed to form the solidified carbon dioxide (sometimes called carbon dioxide ice) from a mixture of carbon dioxide snow and liquid carbon dioxide formed at the temperature of the triple point. This is similar to the method of forming ordinary ice from loose snow under certain conditions. The defect of this process is that the pressure and temperature must be exactly maintained at certain points in order to achieve practical results. Likewise special apparatus is required in order to produce the necessary mixture of carbon dioxide snow and liquid carbon dioxide.

According to my invention, solidified carbon dioxide is produced in the form of a mass or block having a high specific gravity.

The method is also extremely simple because it is not necessary to employ a carbon dioxide of a definite pressure but only of pressures being over the solidifying point. Such liquid carbon dioxide is introduced in an enclosed space and the expansion of the carbon dioxide takes place along the side walls of a solid block of carbon dioxide which is gradually increasing under the pressure.

An example of the invention is shown in the annexed diagrammatic drawing.

The chamber $c$ whose wall can be provided with any suitable heat insulation, is provided with a lower cover $g$. The chamber $c$ is connected by means of pipe $b$, controlled by valve $a$, with a compressor $m$ or with a reservoir or other source of liquid carbon dioxide. The pipe lines $e$ and $i$ are respectively provided with valves $f$ and $k$, and they communicate with the common pipe line $h$. The pipe line $h$ is connected with a gasometer $l$ from which the compressor $m$ sucks the carbon dioxide gas to be liquefied. The pipe line $i$ can also be directly connected with a pressure stage of the compressor $m$, by means of the valve $k_1$ and the pipe line $i_1$. A sieve $d$ is located in the bottom part of the chamber $c$. The cover $g$ of the chamber $c$ is removably connected to a flange of the wall of said chamber by means of bolts $g'$. The cover $g$ is also connected to the sieve $d$ by means of a member $d'$ so that the sieve $d$ is suitably held in position.

The operation of the device according to my improved method is for instance as follows:

The valve $k_1$ remains closed during the whole operation. The valve $a$ is opened so that liquid carbon dioxide can enter the chamber $c$. The valves $f$ and $k$ are also opened. The expansion of the liquid carbon dioxide as it enters the chamber $c$ through the pipe $b$ produces carbon dioxide snow in the ordinary loose form, and this collects upon the sieve $d$. At this point there is nearly no pressure in the chamber $c$. Instead of forming the carbon dioxide snow in the chamber $c$ as above mentioned, the operation can be started by placing carbon dioxide snow in the chamber $c$, before starting the operation of the machine. This carbon dioxide snow can be made in any suitable manner. As soon as a layer of carbon dioxide snow, for instance 25 cm. thickness, has been formed in the chamber $c$ upon the sieve $d$, the valve $k$ is regulated so that a pressure of for instance 20 atmospheres is produced in the chamber $c$. At this pressure, the carbon dioxide which flows into the chamber $c$ remains in liquid form and it accumulates above the layer of carbon dioxide snow. The carbon dioxide snow is thus pressed to form a compact and dense mass which does not permit either liquid or gaseous carbon dioxide to pass through the same. This can be detected because the pressure below the block of solidified carbon dioxide which is thus formed falls to the ordinary atmospheric pressure in the pipe line $e$ and the pressure in the pipe line $e$ continues to be the ordinary atmospheric pressure. The liquid carbon dioxide which is located above the block of carbon dioxide ice which has thus been formed, is now permitted to evaporate and the gas is permitted to pass through the space between the wall of the chamber $c$ and the said block, so that it expands. The lowering of the temperature which is thus produced, freezes or solidifies the liquid carbon dioxide adjacent the upper layer of the solidified block. When the solidified block has reached the desired size, the valve $a$ is closed, the pressure in the chamber $c$ is released, and the cover $g$ is opened. The solidified carbon dioxide thus produced has a specific gravity between 1.4 and 1.5. The block thus formed can be removed and a portion thereof can be sawed off and the rest can remain in the chamber $c$. Upon closing the cover $g$, more liquid carbon dioxide can be led into the chamber $c$. This makes it possible to eliminate the necessity of using carbon dioxide snow upon the sieve and the process can be immediately continued.

Another manner of the operation of the device according to my improved method is for instance as follows:

The valve $k$ remains closed during the whole operation. The whole process is identical with the process described in the above example, with the exception that the regulation of the pressure is made by the valve $k_1$ instead of by the valve $k$.

I have shown some preferred embodiments of my invention, but it is clear that numerous changes and omissions can be made without departing from its spirit.

What I claim is:—

1. A method of producing solidified carbon dioxide which consists in causing an integral mass of solidified carbon dioxide to contact with a body of liquid carbon dioxide which is maintained under a pressure which is substantially above the triple point pressure, while permitting the liquid carbon dioxide to evaporate at a part of the wall of said mass of solidified carbon dioxide so as to reduce said pressure only at said part and to lower the temperature of the mass, so that the size of the mass is increased along that portion of its wall which is subjected to said pressure by the solidification of the liquid carbon dioxide in contact with said mass under said pressure, said pressure being sufficient to cause the liquid carbon dioxide to freeze in a single stage from the liquid state to the dense solid state.

2. A method of producing solidified carbon dioxide which consists in causing an integral mass of solidified carbon dioxide to contact with a body of liquid carbon dioxide which is maintained under a pressure which is substantially above the triple point pressure and while a portion of the periphery of said mass is held closely spaced from a rigid wall, and permitting the liquid carbon dioxide to evaporate and to pass between said rigid wall and the corresponding portion of the periphery of said mass so as to lower the temperature, said pressure being sufficient to cause additional liquid carbon dioxide to directly freeze in dense solid form to that portion of the periphery of said mass which remains in constant contact with the liquid carbon dioxide.

3. A method of producing solidified carbon dioxide which consists in causing an integral mass of solidified carbon dioxide to contact with a body of liquid carbon dioxide under a pressure which is substantially above the triple point pressure, while freezing additional carbon dioxide only at that portion of the periphery of said mass which remains in direct contact with the liquid carbon dioxide, so that the size of said mass is increased while it is subjected to said pressure, said pressure being sufficient to cause said additional carbon dioxide to directly freeze in dense solid form to said mass.

4. A method of producing solidified carbon dioxide which consists in directly lowering the temperature of an integral mass of solid carbon dioxide while said mass is held in contact with a body of liquid carbon dioxide under a pressure which is substantially above the triple point pressure, so that the mass of solidified carbon dioxide increases in size while it is held under said pressure by the freezing of liquid carbon dioxide thereto, said mass of carbon dioxide having its temperature lowered by permitting the evaporation of some of the liquid carbon dioxide in a region which is directly adjacent a part of the periphery of said mass, said pressure being sufficient to cause said liquid carbon dioxide adjacent said mass to directly freeze into dense solid form.

5. In the art of producing solid carbon dioxide, that step which consists in causing an integral mass of solidified carbon dioxide to contact with liquid carbon dioxide, and permitting the liquid carbon dioxide directly adjacent a part of said mass to evaporate in a region adjacent said part to lower the temperature, so that the liquid carbon dioxide directly adjacent the remainder of said mass is frozen to constitute an enlargement of said mass, said liquid carbon dioxide being maintained under a pressure which is substantially above the triple point pressure and which is sufficient to cause said liquid carbon dioxide to freeze directly into dense solid form.

6. A method of producing solid carbon dioxide which consists in forcing liquid carbon dioxide from a container into a closed chamber under pressure, causing the liquid carbon dioxide to contact with a mass of solid carbon dioxide located in said chamber, and permitting some of the liquid carbon dioxide which is directly adjacent said mass to evaporate to gaseous form in a space adjacent said mass in order to lower the temperature, and to pass in gaseous form out of said chamber, the liquid carbon dioxide being maintained in said chamber under a pressure which is substantially above the triple point pressure and which is sufficient to cause said liquid carbon dioxide to directly freeze into dense solid form adjacent said mass so as to enlarge said mass under said pressure.

ERNST BERTHOLD AUERBACH.